(12) United States Patent
Haddad et al.

(10) Patent No.: US 12,711,947 B2
(45) Date of Patent: Aug. 18, 2026

(54) METHOD FOR TRAINING A NEURAL NETWORK AND A DATA PROCESSING DEVICE

(71) Applicant: GN Audio A/S, Ballerup (DK)

(72) Inventors: Karim Haddad, Ballerup (DK); Pejman Mowlaee, Ballerup (DK); Rasmus Kongsgaard Olsson, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 353 days.

(21) Appl. No.: 18/542,728

(22) Filed: Dec. 17, 2023

(65) Prior Publication Data

US 2024/0212668 A1 Jun. 27, 2024

(30) Foreign Application Priority Data

Dec. 22, 2022 (EP) .................................... 22216102

(51) Int. Cl.

| | |
|---|---|
| ***G10L 25/30*** | (2013.01) |
| ***G10L 15/06*** | (2013.01) |
| ***G10L 21/0216*** | (2013.01) |
| ***G10L 25/60*** | (2013.01) |
| *G10L 21/0208* | (2013.01) |

(52) U.S. Cl.

CPC ........ *G10L 15/063* (2013.01); *G10L 21/0216* (2013.01); *G10L 25/30* (2013.01); *G10L 25/60* (2013.01); *G10L 2021/02082* (2013.01)

(58) Field of Classification Search

CPC .............................. G10L 15/063; G10L 25/30

See application file for complete search history.

(56) References Cited

U.S. PATENT DOCUMENTS

| | | | | |
|---|---|---|---|---|
| 10,891,949 | B2 * | 1/2021 | Narayanan | B60W 10/18 |
| 12,518,764 | B2 * | 1/2026 | Ramos | G10L 17/20 |
| 2020/0051549 | A1 * | 2/2020 | Chen | G06N 3/08 |
| 2023/0031733 | A1 * | 2/2023 | Wang | G10L 15/063 |

(Continued)

OTHER PUBLICATIONS

The extended European search report issued in European Application No. 22216102.8, dated May 11, 2023.

(Continued)

*Primary Examiner* — Bryan S Blankenagel

(74) *Attorney, Agent, or Firm* — HSML P.C.

(57) ABSTRACT

A computer-implemented method for training a neural network by using a data processing device is presented. The method comprises providing pairs of target audio data sets and distorted audio data sets to the neural network, providing values of user preference settings, wherein the values are associated to the pairs of target and distorted audio data sets, such that the neural network can be trained by a combination of the pairs of the target audio data and the distorted audio data in combination with the values of the user preference settings, wherein the distorted audio data and the values of the user preference settings are used as inputs to the neural network during training, and wherein a loss function used for training the neural network is a function of the values of the user preference settings, the target audio data, and the distorted audio data thereby providing for that a variety of user preference settings can be met with one and the same trained neural network.

15 Claims, 4 Drawing Sheets

Providing pairs of clean audio data sets and noise containing data sets — 602

Providing values of user preference settings — 604

Providing information about type of audio output device — 606

(56) References Cited

U.S. PATENT DOCUMENTS

| | | | | |
|---|---|---|---|---|
| 2023/0209283 | A1* | 6/2023 | Wagner | H04R 25/606 381/312 |
| 2024/0112690 | A1* | 4/2024 | Faubel | G10L 21/0208 |
| 2024/0161765 | A1* | 5/2024 | Wojcicki | G06N 3/09 |

OTHER PUBLICATIONS

Ivry et al., "Deep Residual Echo Suppression with A Tunable Tradeoff Between Signal Distortion and Echo Suppression", arXiv:2106.13531, pp. 126--130, year 2021.

Braun et al., "Task splitting for DNN-based acoustic echo and noise removal", arXiv:2205.06931, IEEE IWAENC 2022.

* cited by examiner

METHOD FOR TRAINING A NEURAL NETWORK AND A DATA PROCESSING DEVICE

TECHNICAL FIELD

The present invention relates to audio data processing, sometimes referred to as audio signal processing. More specifically, the disclosure relates to a method for training a neural network for processing audio data such that e.g. speech intelligibility can be improved.

BACKGROUND

In the field of audio data processing, the use of neural networks have increased during the last couple of years. By providing the neural network with training data, the neural network can be configured to remove noise, remove echo etc from incoming audio data, also referred to as audio input data. Generally, the neural networks have proven useful for classifying different components of the audio input data such that in turn unwanted components, such as echo or noise, can be removed from the audio data before being presented to a user. In addition to being able to classify different components, the neural networks are also useful in the field of audio processing in that non-linear relationships can be identified efficiently. Put differently, complex relationships between the different audio components can efficiently be identified if using neural networks. Due to the advantages, neural networks are today used in headsets and other hearing devices for improving sound quality. For instance, improved sound quality may be improved noise cancelling, that is, removing unwanted sound components, such as traffic sound, but not speech components, such that speech intelligibility can be improved. Due to the complexity of multilayer neural networks commonly used, the actual classification of the different sound components is however most often not made available, but only the processed audio data, that is the audio data output from the neural network.

Even though using neural networks for audio data processing comes with a number of advantages, there is still a need for improvement. One reason is that different user groups are exposed to different sound environments. As a result, in case the training data used for the neural network does not fully correspond to the sound environment in which the headset or other device comprising the neural network is later used, the audio processing performed may not live up to the expectations of the user of the headset. For instance, in case the headset is used on a construction site and primarily is used for radio communication with other users, and the neural network is trained for noise in a public transportation environment and adapted to meet preferences of a user listening to music, the audio processing may not be able to adequately sort out unwanted sound components arising on the construction site.

Based on the above, there is a risk that the audio processing does not meet the expectations of the user in case the environment to which the training data relates and an actual environment in which the headset is used are misaligned. In addition, different user groups may have different expectations and preferences. For instance, a user prioritizing speech intelligibility may accept that sound components are removed that another user, prioritizing music listening experience before speech intelligibility, may not accept. Thus, there may also be a difference in preference not directly correlated to the sound environment in which the headset is used.

Thus, there is a need for a method that can make use of the benefits related to using neural networks for audio processing and, in addition, provide for that specific needs or preferences related to the end use of the headset or other audio device can be taken into account.

SUMMARY

According to a first aspect, it is provided a computer-implemented method for training a neural network by using a data processing device. The neural network may be configured to provide, during inference, processed audio data based on audio input data. The method may comprise providing pairs of target audio data sets and distorted audio data sets to the neural network, and providing values of user preference settings. The values may be associated to the pairs of target and distorted audio data sets, such that the neural network can be trained by a combination of the pairs of the target audio data and the distorted audio data in combination with the values of the user preference settings. The distorted audio data and the values of the user preference settings may be used as inputs to the neural network during training. A loss function used for training the neural network may be using the values of the user preference setting, the target audio data, and the processed audio data, output from the neural network, thereby providing for that a variety of user preference setting can be met with one and the same trained neural network.

Put differently, a loss function used for training the neural network may be a function of the values of the user preference settings, the target audio data and the distorted audio data, thereby providing for that a variety of user preference settings can be met with one and the same trained neural network.

An advantage with having the neural network trained in this way is that after the neutral network is trained, a device in which the neural network is comprised in may be fine-tuned by using different values of the user preference settings. Thus, instead of having specific neural networks trained for different specific environments and/or user preferences, one and the same network is trained by taking into account the values of the user preference settings, such that the neural network can later be fine tuned.

The values of the user preference settings may comprise one or more parameter values for controlling denoising, dereverberation, and echo cancellation.

The method may further comprise providing information about type of audio output device intended to output, during inference, the processed audio data, wherein the type of audio output device is associated to the pairs of target and distorted data sets.

During training, the target audio data sets, e.g. clean speech data sets, the distorted audio data sets, e.g. dirty speech data sets, and the values of the user preference settings, i.e. reflecting the user's preferences in view of the sound waves formed by the audio output device, can be taken into account. By also take into account that e.g. the audio input device is intended to be a loud speaker having a power output in a range of 100-300 W, the same neural network can be used for a wide range of types of audio output devices.

The type of audio output device may be a two-way communication device comprising a microphone and a speaker.

Since hearing devices provided with both the microphone and the speaker may be configured to compensate for some distortions related to a room or other environment in which the audio output device is placed, the processed audio data set provided to such type of audio output device may thus be different compared to the processed audio data set provided to an audio output device only comprising the speaker, but not the microphone.

It should be noted in this context, a hearing device, or a communication device, comprising both the microphone and the speaker may function both as the audio input device and the audio output device.

The type of audio output device may be selected from a group comprising of a hearing aid, a headset, a sound bar, a loudspeaker, a speakerphone, a hearable, and a conference speaker.

According to a second aspect it is provided a method for configuring a communication device. The method may comprise providing the communication device, wherein the communication device comprises a neural network trained according to the first aspect, and adjusting values of the user preference settings such that processed audio data output from the communication device meets a quality of experience score.

In this context, meeting the quality of experience score should be understood as fulfilling pre-determined criteria.

The quality of experience score may be indicative of one or more distortion types.

The communication device may be a two-way communication comprising a microphone and a speaker, wherein a first digital signal processing (DSP) device may be associated with the microphone and a second DSP device may be associated with the speaker. The method may further comprise based on the adjusted values of the user preference settings and the neural network, configuring the first and second DSP device such that the two in combination provide for that the processed audio data meets the quality of experience score.

The method may be performed as part of a tuning process.

According to a third aspect, it is provided a data processing device for training a neural network, wherein the neural network may be configured to provide, during inference, processed audio data based on audio input data, the data processing device comprising circuitry configured to execute: an audio data obtaining function configured to obtain pairs of target audio data sets and distorted audio data sets, and a user preference obtaining function configured to obtain values of user preference settings, wherein the values are associated to the pairs of target and distorted data sets, such that the neural network can be trained by the target audio data sets and the processed audio data sets, output from the neural network, in combination with the values of the user settings values, thereby providing for that a variety of user preferences can be met with one and the same trained neural network.

The same features and advantages as presented with respect to the first aspect also apply to this third aspect.

The values of the user preference settings may comprise one or more parameters for controlling denoising, dereverberation, and echo cancellation.

According to a fourth aspect, it is provided a communication device provided with a neural network, wherein the neural network may be configured to provide, during inference, processed audio data based on audio input data, wherein the neural network may be obtained by a process according to the first aspect.

The communication device may be a two-way communication device comprising a microphone and a speaker.

The communication device may be selected from a group comprising of a hearing aid, a headset, a sound bar, a loudspeaker, a speaker phone, and a conference speaker.

According to a fifth aspect, it is provided a non-transitory computer-readable storage medium storing one or more programs configured to be executed by one or more processors of a processing system, the one or more programs comprising instructions for performing the method according to the first aspect.

The term "neural network" should in this context be construed broadly and this should encompass any type of model or network that can be configured to solve a task, e.g. reducing noise, reverberation and/or echo to achieve speech enhancement, based on training data, that is, input data sets and output data sets that can serve as a reference for how the model is to deliver. The "neural network" may be a so-called deep learning network comprising several layers of neurons with tunable connection strengths between the neurons. Further, the training of the neural network may be supervised learning, semi-supervised learning, unsupervised learning, reinforcement learning as well as self-learning.

The term "inference" should be given its ordinary meaning, which is considered to be "operationalizing a machine learning model, such as a neural network" or, put differently, "putting the machine learning model, e.g. the neural network, into production".

The term hearing device used herein should be construed broadly to cover any device configured to receive audio input data, i.e. audio data comprising speech, and to process this data. By way of example, the hearing device may be a conference speaker, that is, a speaker placed on a table or similar for producing sound for one or several users around the table. The conference speaker may comprise a receiver device for receiving the audio input data, one or several processors and one or several memories configured to process the audio input data into audio output data, that is, audio data in which speech intelligibility has been improved compared to the received audio input data.

The hearing device may be configured to receive the audio input data via a data communications module. For instance, the device may be a speaker phone configured to receive the audio input data via the data communications module from an external device, e.g. a mobile phone communicatively connected via the data communications module of the hearing device. The device may also be provided with a microphone arranged for transforming incoming sound into the audio input data.

The hearing device can also be a hearing aid, i.e. one or two pieces worn by a user in one or two ears. As is commonly known, the hearing aid piece(s) may be provided with one or several microphones, processors and memories for processing the data received by the microphone(s), and one or several transducers provided for producing sound waves to the user of the hearing aid. In case of having two hearing aid pieces, these may be configured to communicate with each other such that the hearing experience could be improved. The hearing aid may also be configured to communicate with an external device, such as a mobile phone, and the audio input data may in such case be captured by the mobile phone and transferred to the hearing device. The mobile phone may also in itself constitute the hearing device.

The hearing aid should not be understood in this context as a device solely used by persons with hearing disabilities, but instead as a device used by anyone interested in perceiving speech more clear, i.e. improving speech intelligibility. The hearing device may, when not being used for providing the audio output data, be used for music listening or similar. Put differently, the hearing device may be earbuds, a headset or other similar pieces of equipment that are configured so that when receiving the audio input data this can be transformed into the audio output data as described herein.

The hearing device may also form part of a device not solely used for listening purposes. For instance, the hearing device may be a pair of smart glasses. In addition to transforming the audio input data into the audio output data as described herein and providing the resulting sound via e.g. spectacles sidepieces of the smart glasses, these glasses may also present visual information to the user by using the lenses as a head up-display.

The hearing device may also be a sound bar or other speaker used for listening to music or being connected to a TV or a display for providing sound linked to the content displayed on the TV or display. The transformation of incoming audio input data into the audio output data, as described herein, may take place both when the audio input data is provided in isolation, but also when the audio input data is provided together with visual data.

The hearing device may be configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. The hearing device may be a speaker phone or a sound bar. Hearing devices can include both prescription devices and non-prescription devices.

The hearing device may be embodied in various housing styles or form factors. Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

The hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

The hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

The hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

The wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a smartphone and/or a smart watch.

The hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

The hearing device may comprise an output transducer. The output transducer may be coupled to the processing unit. The output transducer may be a loudspeaker. The output transducer may be configured for converting the first electric output signal into an acoustic output signal. The output transducer may be coupled to the processing unit via the magnetic antenna.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

The hearing device may comprise a digital-to-analogue converter configured to convert the first electric output signal, the second electric output signal and/or the wireless output signal into an analogue signal.

The hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

The hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The hearing device may comprise a memory, including volatile and non-volatile forms of memory.

The hearing device may comprise one or more antennas for radio frequency communication. The one or more antenna may be configured for operation in ISM frequency band. One of the one or more antennas may be an electric antenna. One or the one or more antennas may be a magnetic induction coil antenna. Magnetic induction, or near-field magnetic induction (NFMI), typically provides communication, including transmission of voice, audio and data, in a range of frequencies between 2 MHz and 15 MHz. At these frequencies the electromagnetic radiation propagates through and around the human head and body without significant losses in the tissue.

The magnetic induction coil may be configured to operate at a frequency below 100 MHz, such as at below 30 MHz, such as below 15 MHz, during use. The magnetic induction coil may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

The electric antenna may be configured for operation at a frequency of at least 400 MHz, such as of at least 800 MHz, such as of at least 1 GHz, such as at a frequency between 1.5 GHz and 6 GHz, such as at a frequency between 1.5 GHz and 3 GHz such as at a frequency of 2.4 GHz. The antenna may be optimized for operation at a frequency of between 400 MHz and 6 GHz, such as between 400 MHz and 1 GHz, between 800 MHz and 1 GHz, between 800 MHz and 6 GHz, between 800 MHz and 3 GHz, etc. Thus, the electric antenna may be configured for operation in ISM frequency band. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, $\lambda$ being the wavelength corresponding to the emitted electromagnetic field.

The present invention relates to different aspects including the hearing device and the system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
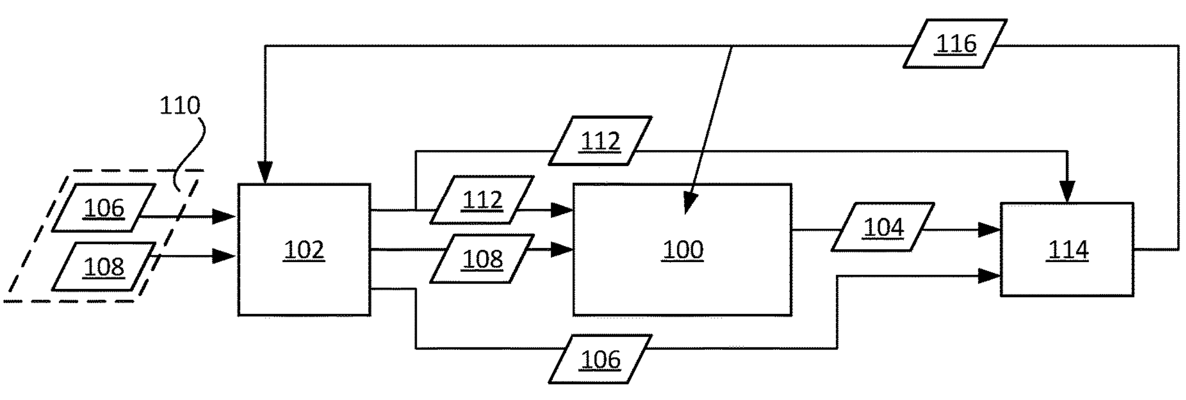
FIG. 1 illustrates a general principle for training a neural network by using target audio data sets, distorted audio data sets, and values of user preference settings.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a general principle for training a neural network 100. During a training phase, a data processing device 102, which may be a PC or other piece of equipment configured to process data, may be configured to receive target audio data sets 106 and distorted audio data sets 108. The target audio data sets 106 may comprise so-called clean speech data, i.e. data that can serve as a reference for an ideal output from the neural network, and the distorted audio data sets 108 may comprise data that can serve as a reference for an expected input to the neural network 100. The target audio data sets 106 and the distorted audio data sets 108 may come in pairs 110 such that a related target audio data set can be provided for each distorted audio data set.

As illustrated, the distorted audio data set 108 may be fed from the data processing device 102 to the neural network 100. In addition to the the distorted audio data set 108, values 112 of user preference settings may be fed from the data processing device 102 to the neural network 100. The user preference settings may comprise one or more parameter values for controlling denoising, dereverberation, and echo cancellation. By providing the values 112 of the user preference settings, the neural network 100 can be trained with these values 112 as input, which has the advantage that the neural network 100 can later on be fine-tuned by changing these values 112. Put differently, when training the neural network 100 with different combinations of target audio data sets 106, distorted audio data sets 108 and values 112 of user preference settings, a model is formed that is spanning over a space of different values of user preference settings. By having this model, it is made possible to later on, after the neural network 100 has been trained, to change the values such that different user preferences can be met with one and the same neural network 100. Thus, instead of using pairs of target audio data sets and distorted audio data sets for a specific sound environment or user preference to train a neural network specifically to meet demands linked to this specific sound environment or specific user preference, the approach herein suggest to provide the values 112 of user settings as input to the training such that the same neural network can be used for a range of different values of user preference settings.

To provide for that the neural network can be fine-tuned, by changing the user preference settings, at a later stage, the target audio data set 106 is, in addition to being fed into the neural network 100, also fed into a loss function 114. In a similar way, the values 112 of the user preference settings is also fed into the loss function 114. Processed audio data sets 104, that is output from the neural network 100, can also be fed into the loss function 114. By comparing the processed audio data 104 with the target audio data 106, deviations between the two can be identified. Since different values of the user preference settings may result in that different types of deviations are weighted differently, the values 112 of the user preference settings can be taken into account when determining loss data 116, that is, output from the loss function 114. The loss data 116 can be fed into the neural network 100 directly, and it can also be fed into the data processing device 112 such that a training loop is formed. The data processing device 102 can be a personal computer or any other piece of equipment provided with a user interface and suitable for receiving and transmitting data as described above. Alternatively, the data processing device 102 may be without the user interface and configured to receive the values 112 of the user preference settings from another device provided with a user interface.

Generally, by way of example, the neural network 100 can be trained by that a gradient of the loss function 114 is computed with respect to current parameters. An optimizer, i.e. a software module, can use the gradient to change the parameters in a direction that can lower the loss. This process may be repeated until a minimum has been found. Even though using the gradient for finding the minimum has proven a successful implementation other ways for training the neural network 100 can also be applied. The values 112 of the user preference settings may be related to different distortion types, such as echo, dereverberation and noise, either in isolation or in combination. In addition, the values 112 may indicate how different distortion types should be compensated for in different intervals. For instance, in one specific case, the values 112 may indicate that echo below an amplitude threshold should not be compensated for, but above this threshold a compensation should occur. The values 112 may be linked to the loss function 114 used.

Figure 2:
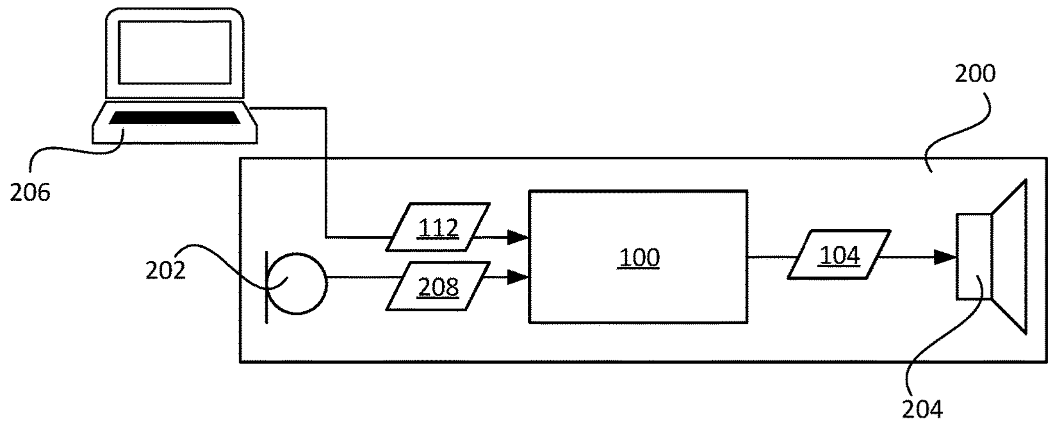
FIG. 2 generally illustrates how a communication device comprising the neural network trained according to the principle illustrated in FIG. 1 can be fine-tuned.

Once the neural network 100 has been trained, this may be integrated into a communication device 200 as illustrated in FIG. 2. The communication device 200 may be a headset, a mobile phone, a hearing aid or any other hearing device comprising an audio input device 202, such as a microphone, and an audio output device 204, such as a speaker. Even though not illustrated, the communication device 200 may also comprise a data communications device arranged to receive, and optionally also transmit, audio data from an external device. Such external device may both be a remotely placed device, e.g. a mobile phone transferring data over a mobile communications network, or a device placed within a short range, e.g. an external speaker communicating via Bluetooth™. The audio input device 202 may be used for capturing speech or other information to be presented to the user of the communication device 200, but it may also be used for audio processing purposes, e.g. the audio input device 202 may be used for capturing information about noise such that the noise cancelling processing can be adapted in accordance with this captured noise. The audio output device 204 may be a speaker arranged to provide sound waves for a group of people, but it may also be a speaker arranged in an earbud to be placed in an ear of the user.

Since the neural network 100 has been trained by a combination of the target audio data sets 106, the distorted audio data sets 108 and the values 112 of the user preference settings, the communication device 200 can be fine-tuned by changing the values 112 of the user preference settings by using a user device 206, such as a personal computer. As an effect of that the values 112 of the user preference settings have been used as one part of the training data used for configuring the neural network 100, different values 112 of the user preference settings input by a user via the user device 206 will give rise to different processed audio data sets 104. In addition or instead, the communication device 200 can be fine-tuned by changing the loss function 114. By way of example, when fine-tuning a sound bar, this may be placed in a test environment similar to an environment in which the sound bar will typically be placed. Sound will be captured by the audio input device 202 and transformed into audio input data 208 transferred to the neural network 100. In parallel, values 112 of the user preference settings will be transferred to the neural network 100 from the user device 206. The user preference settings may, by way of example, relate to denoising, dereverberation, and/or echo cancellation. Based on the combination of the values 112 of user preference settings and the audio input data 208, the processed audio data set 104 is output from the neural network 100 and transferred to the audio output device 204. In case the user, which may be a sound engineer responsible for fine-tuning the sound bar, can register sound artifacts or other unwanted deviations, the procedure may be re-iterated with amended values 112 of the user preference settings input to the neural network. Once having adjusted the values 112 such that sound waves output from the audio output device 204 meets a quality of experience score, which may be indicative of one or more distortion types, the communication device 200 can be considered fine-tuned.

Figure 3:
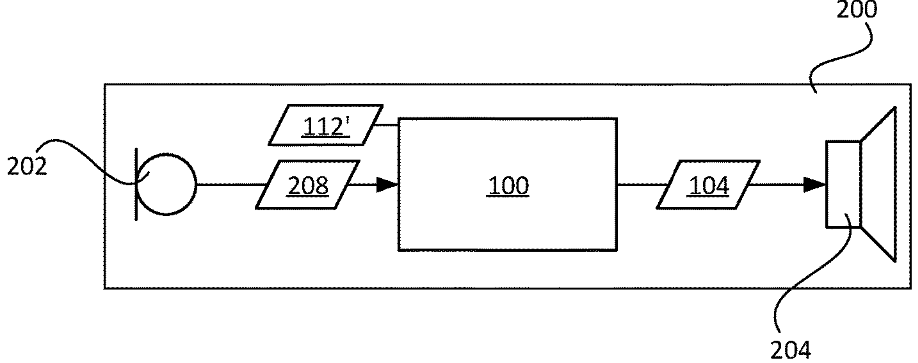
FIG. 3 generally illustrates the communication device after this has been fine-tuned as illustrated in FIG. 2.

Once the communication device 200 is fine-tuned, adjusted values 112' of the user preference settings may be stored in the communication device 200 as illustrated in FIG. 3. Put differently, continuing the example above, once the sound engineer has found the adjusted values 112' resulting in that the sound waves output via the audio output device 204 meets the quality of experience score, these adjusted values 112' can be stored in the sound bar, thereby providing for that the neural network 100 that may be used for a wide range of communication devices 200 can be fine-tuned for the particular preferences linked to users of the sound bar.

Figures 4, 5:
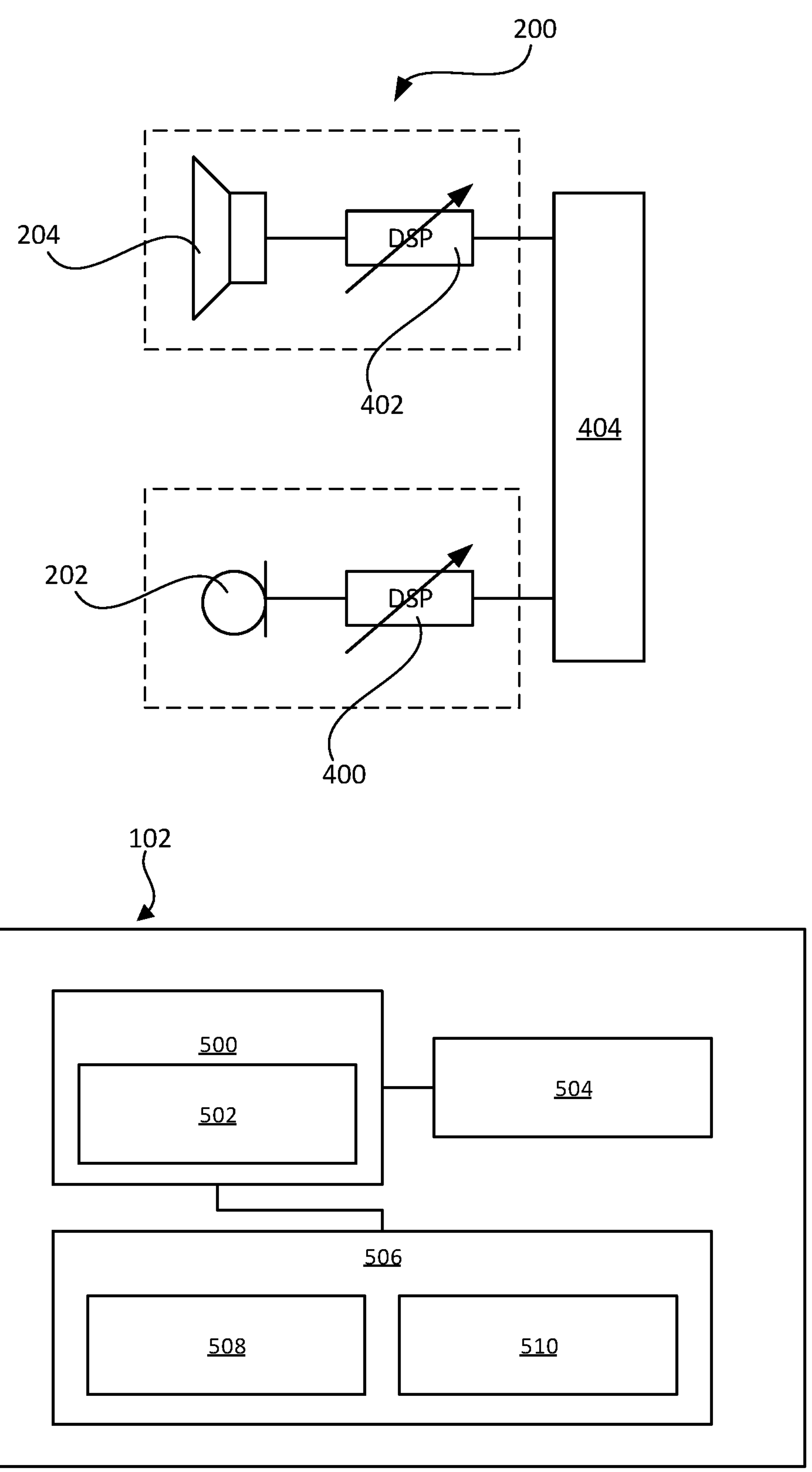
FIG. 4 illustrates an audio output device comprising a speaker and a microphone.
FIG. 5 illustrates the data processing device in further detail.

The communication device 200 may be arranged as illustrated in FIG. 2 and FIG. 3 with the neural network 100 being used for providing the processed audio data 104 to the audio output device 204 based on the audio input data 208 received from the audio input device 202, but as illustrated in FIG. 4, other arrangement are also possible. As illustrated in FIG. 4, a first digital signal processor (DSP) 400 can be associated with the audio input device 202 and a second DSP 402 can be associated with the audio output device 204. The first and second DSP 400, 402 may be linked via an interface 404 such that data can be exchanged between the two. By having dedicated signal processing, or audio data processing, for the audio input device 202 and the audio output device 204, it is made possible to more closely meet different challenges linked to specific devices. The general principle illustrated in FIG. 1 and described above may also be used in arrangements with dedicated DSPs for the audio input device and the audio output device as illustrated in FIG. 4. However, since there are two different DSPs, that is, two different data processing devices involved in transforming the audio input data 208 into the processed audio data 104, the values 112 of the user preference settings may be provided to both the first and second DSP 400, 402 during the training and two different sets of the adjusted values 112', one for each DSP, may be provided after the fine-tuning illustrated in FIG. 2.

Even though not illustrated, the audio output device 204 may be a two-way communication device, that is, the audio output device 204 may not only be arranged to produce sound waves via e.g. a speaker, but also capture sound waves, e.g. via a microphone. One reason for having the audio output device 204 arranged in this way may be to provide the possibility to adapt the sound waves generated and output via the speaker as a function of the sound waves captured via the microphone. When having the audio output device 204 arranged in this way, the second DSP 402 may be configured not only to process the processed audio data set 104 received from the neural network 100, but also to process data received via the microphone comprised in the audio output device 204 itself.

Optionally, in addition to the values 112 of the user preference settings, the distorted audio data set 108 and the target audio data set 106, information about type of audio output device 204 intended to output, during inference, the processed audio data 104 may be provided to the neural network 100 during training as well as inference. By having information about the intended audio output device 204, the training of the neural network 100 may be adapted also based on this information. This may prove extra helpful in case the audio input device 202 and the audio output device 204 are two separate units and the audio input device 202 is to be used for a variety of different types of audio output devices 204.

As discussed above, the data processing device 102 used for training the neural network 100 may be a personal computer or any other device suitable for being configured to train the neural network 100 as set out above and illustrated in FIG. 1. FIG. 5 illustrates, by way of example, the data processing device 102 in further detail. As illustrated, the data processing device 102 may comprise circuitry 500 holding a processor 502. Communicatively connected to the circuitry 500, it may be provided a transceiver 504 enabling data communication with units external to the data processing device 102. A memory 506 may also be provided, and as the transceiver 504, the memory 506 may be communicatively connected to the circuitry 500. The memory 506 may hold program code, that is, instructions, providing an audio data obtaining function 508 as well as a user preference value obtaining function 510. The audio data obtaining function 508 may be configured to obtain and forward the target audio data sets 106 and the distorted audio data sets 108, and the user preference value obtaining function 510 to obtain and forward the values 112 of the user preference settings. These values may e.g. be obtained via a user interface provided on the data processing device 102. In addition, the loss data 116 output from the loss function 114 may also be obtained and forwarded by the data processing device 102.

Figure 6:
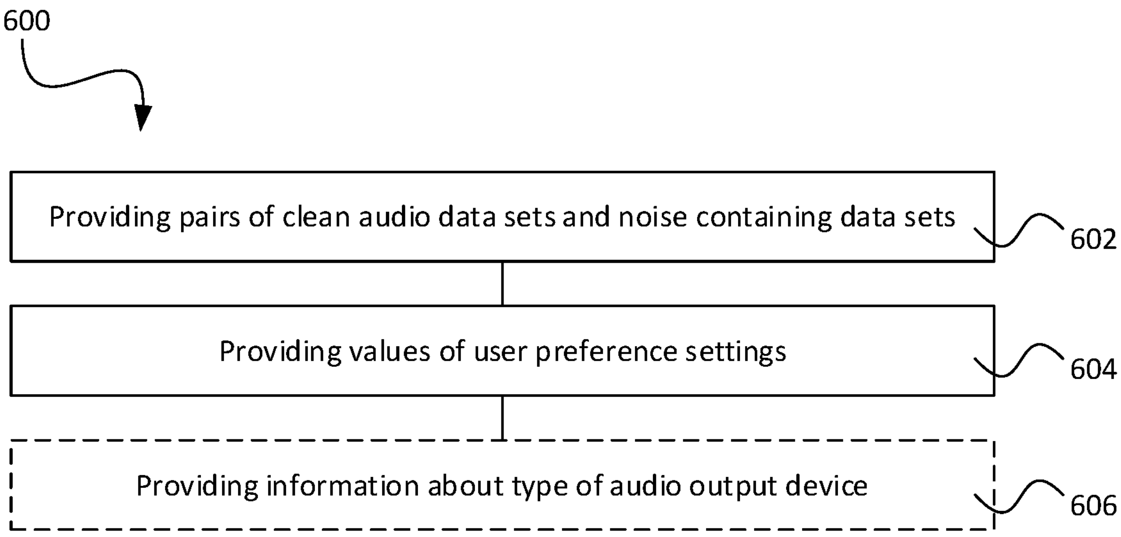
FIG. 6 is a flowchart illustrating a method for training a neural network.

FIG. 6 is a flowchart illustrating a method 600 for training the neural network 100 by using the data processing device 102. In step 602, the pairs 110 of target audio data sets 106 and distorted audio data sets 108 may be provided to the neural network 100. In step 604, the values 112 of user preference settings may be provided. The values 112 may be associated to the pairs 110 of target and distorted audio data sets 106, 108. In this way the neural network 100 can be trained by a combination of the pairs 110 of the target audio data 106 and the distorted audio data 108 in combination with the values 112 of the user preference settings. The loss function 114 used for the training of the neural network may be a function of the values 112 of the user preference settings, the target audio data 106, and the distorted audio data 108 thereby providing for that a variety of user preference settings can be met with one and the same trained neural network.

Optionally, in step 606, information about type of audio output device 204 intended to output, during inference, the processed audio data 104 may be provided. The type of audio output device 204 may be associated to the pairs 110 of target and distorted data sets 106, 108.

Figure 7:
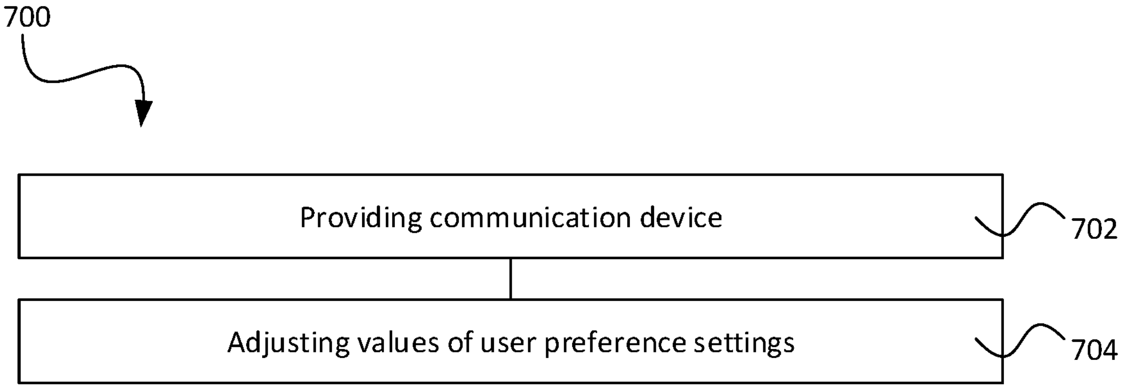
FIG. 7 is a flowchart illustrating a method for configuring a communication device comprising the neural network trained according to the method illustrated by the flowchart of FIG. 6.

FIG. 7 is a flowchart illustrating a method 700 for configuring a communication device 200. In step 702, the communication device 200, comprising the neural network 100 trained according to the method illustrated in FIG. 6, is provided. In step 704, the values 112 of the user preference settings can be adjusted such that processed audio data 104 output from the communication device 200 meets the quality of experience score. The quality of experience score may be indicative of one or more distortion types. Further in detail, the quality of experience may include a number of measurement values, each linked to one or more of the distortion types, providing for that it is made possible by measuring on the sound waves output by the audio output device 204 in response to the processed audio data set 104 to determine whether or not the sound waves generated are in line with the user expectations and preferences and also to what extent these are in line.

On a more detailed level, in many machine learning applications of today, it is common that the loss function or training scheme used to train a neural network (NN) is adjusted once only during the training stage with some trainable parameters included as neurons in the layers. These trainable parameters are frozen when reaching a trained neural network model. This leaves the limitation that the NN design must fit to the unknown trade-off performance defined by the user preference (not observed during the tuning or production of the model). This issue exists for any transmitter/receiver (TX/RX) application including but not limited to denoising, echo cancelation, dereverberation, bandwidth extension, or any other TX pick-up or RX processing.

As an example, the trade-off between noise attenuation, dereverberation and speech distortion in a TX pick up is quite user-dependent and the trained neural network model in the conventional way can only handle a fixed set up parameters included during training, hence the outcome is fitted to a limited preference. As a second example considered here, in acoustic echo cancellation the achievable performance is bounded with a trade-off between the amount of echo leak and the distortion of the desired near-end signal. This is a direct consequence of a fixed choice of the loss function used during training which needs to fit to the preference of an arbitrary user which will apply neural network during inference only, hence NN has not met the user's preference within the chosen loss during training stage.

The problem with the conventional NN methods is the fact that the loss function chosen during training is fixed and only reflects one set of preference or trade-off which is not arguably addressing an arbitrary user employing the NN solution during inference. Therefore, the trained NN models are fixed solutions without possibility to adjust them in the run-time without re-training or fine-tuning them throughout a further post-training stage which is both time-consuming and sub-optimal.

It is herein proposed a NN method where some embedding info are provided and tiled to the feature set of the NN such that the preference of the user later is reflected during inference. The embedding information could be e.g. information conveyed about the loss function included but not limited to the following: shape, P-norm, compression weight and exponent, and its overall definition which is locked in the conventional NN training.

Figure 8:
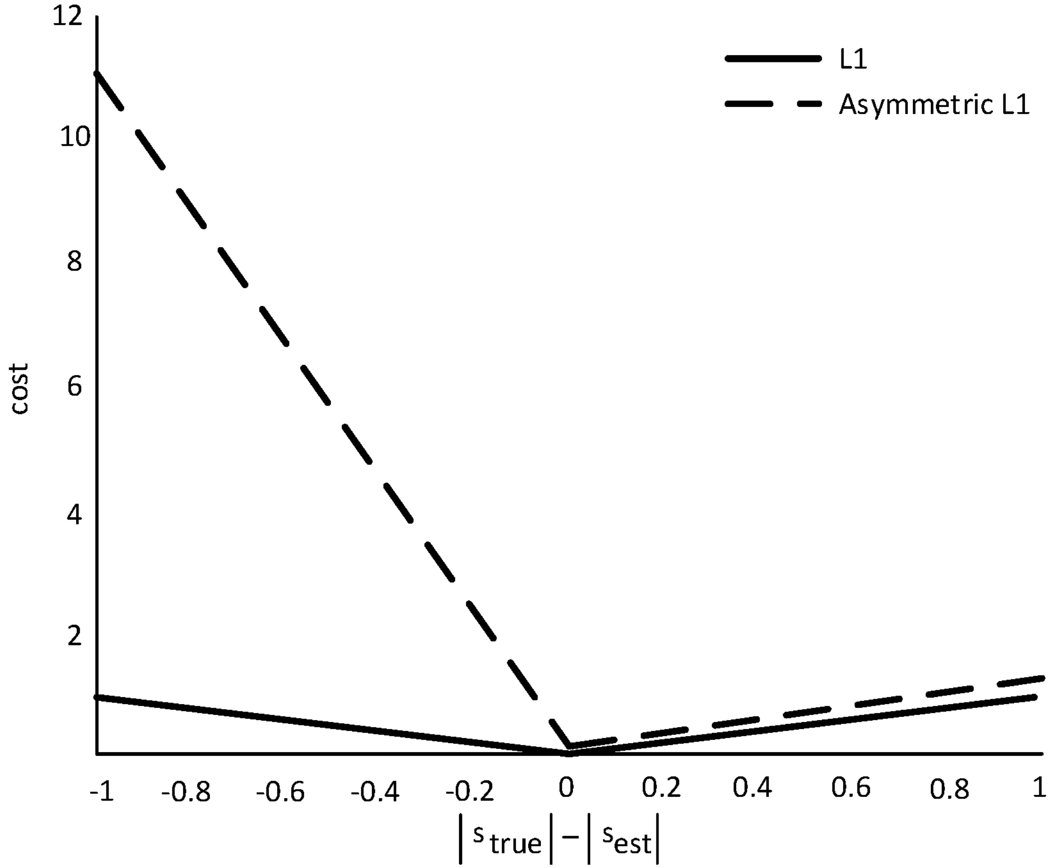
FIG. 8 illustrates, by way of example, a comparison between symmetric and asymmetric loss for L1 norm as an example to put further emphasis towards echo leak.

FIG. 8 illustrates, by way of example, a comparison between symmetric and asymmetric loss for L1 norm as an example to put further emphasis towards echo leak, hence an attractive candidate as an anti-echo leak loss function to train neural networks to solve acoustic echo cancellation. A symmetric loss function is often chosen as a target for training loss function to train a NN. As an example, MSE cost function or any other quadratic function is symmetric. However, in practice there needs to be further penalization towards e.g. errors due to the echo leak versus the other errors. On the other hand, the NN output ($s_{est}$) cannot be above the true reference signal ($s_{true}$), hence any negative error in the cost function has to be punished harshly for the region where $|s_{true}|-|s_{est}|<0$ as illustrated in FIG. 8.

As a proof-of-concept for the approach suggested herein, the acoustic echo cancellation problem may be considered. The typical loss function is designed e.g. based on its norm and compression factor (power exponent denoted by c) and further mixed with other loss terms to reflect the importance of difference distortions (balance a trade-off).

$$L(\hat{S}, S) = \sum_{k,n} \left| |\hat{S}|^c e^{j\varphi_{\hat{s}}} - |S|^c e^{j\varphi_s} \right| + a \left| |\hat{S}|^c - |S|^c \right| \quad (1)$$

where c is a compression applied to magnitude set to c=0.3 in [1], k and n are the frequency and time indices, respectively, S and $\hat{S}$ are the desired clean and estimated speech signals, respectively. The total loss is a combination of the loss in Eq. (1) and an asymmetric loss defined by:

$$L_{asym}(\hat{s}, s) = \sum_{k,n} \max\{|\hat{S}|^c - |S|^c, 0\}^2 \quad (2)$$

where $$L = L(\hat{S}, S) + \lambda L_{asym}(\hat{s}, s) \quad (3)$$

where $0<\lambda<1$ is a mixing coefficient between the two sub-terms, and in case of no asymmetric loss $\lambda=0$, the loss boils down to Eq. (1) only, allowing to choose between a asymmetric and an symmetric cost function (see FIG. 8). Some typical examples are c=0.3 or c=0.5, $\lambda=0$, 0.5 or 1.

These parameters may be included as preference inputs embedded into NN topology. As examples, feed forward layers could be used to tile such information together with other conventional features normally used by a NN. FIG. 1 visualizes the training of NN with the addition of these embedding information.

Once the NN trained weights are found, the trained NN weights can be used for inference of a noisy input shown in FIG. 2. Now the NN can be used together with any set or combination of the embedding info selectable by the user during inference. This means that the user preference can be addressed during the run-time of the trained NN and is translated to a better achievable trade-off which was not possible with the conventional method (illustrated in FIG. 8).

Even though presented above with respect to acoustic echo cancellation, it should be noted that the overall scope of possible applications applicable for the suggested approach is broad and it may cover any signal enhancement TX/RX use case using NN. By way of example, this may include deep noise suppression, acoustic echo cancellation, artificial bandwidth extension, and dereverberation.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

- 100—neural network
- 102—data processing device
- 104—processed audio data set
- 106—target audio data set
- 108—distorted audio data set
- 110—pairs
- 112—values of user preference settings
- 112'—adjusted values
- 114—loss function
- 116—loss data
- 200—communication device
- 202—audio input device
- 204—audio output device
- 206—user device, e.g. PC
- 208—audio input data
- 400—first DSP
- 402—second DSP
- 404—interface
- 500—circuitry
- 502—processor

504—transceiver
506—memory
508—audio data obtaining function
510—user preference value obtaining function The invention clamed is:

1. A computer-implemented method for training a neural network by using a data processing device, wherein the neural network is configured to provide, during inference, processed audio data based on audio input data, the method comprising:

inputting pairs of target audio data sets and distorted audio data sets to the neural network from the data processing device;

providing values of user preference settings from the data processing device;

associating the provided values of the user preference settings to the pairs of target and distorted audio data sets;

training the neural network by a combination of the pairs of the target audio data and the distorted audio data in combination with the provided values of the user preference settings, wherein the training includes inputting the distorted audio data and the provided values of the user preference settings to the neural network, and forming a training loop by inputting into a loss function used for training the neural network the values of the user preference settings, the target audio data, and processed audio data output from the neural network, the neural network corresponding to a communication device, to output loss data that is input to the trained neural network.

2. The method according to claim 1, wherein the values of the user preference settings comprise one or more parameter values for controlling denoising, dereverberation, and echo cancellation.

3. The method according to claim 1, further comprising:

inputting information about a type of audio output device intended to output, during inference, the processed audio data, wherein the type of audio output device is associated to the pairs of target and distorted data sets.

4. The method according to claim 3, wherein the type of audio output device is a two-way communication device comprising a microphone and a speaker.

5. The method according to claim 3, wherein the type of audio output device is selected from a group comprising of a hearing aid, a headset, a sound bar, a loudspeaker, a speakerphone, a hearable, and a conference speaker.

6. A method for configuring a communication device, said method comprising:

training a neural network according to the method of claim 1;

integrating the trained neural network into the communication device; and adjusting values of the user preference settings such that processed audio data output from the communication device meets a quality of experience score.

7. The method according to claim 6, wherein the quality of experience score is indicative of one or more distortion types.

8. The method according to claim 6, wherein the communication device is a two-way communication device comprising:

a microphone; and a speaker, wherein a first digital signal processing device is associated with the microphone and a second DSP device is associated with the speaker, the method further comprising:

adjusting values of the user preference settings and the neural network, so that processed audio data from the first and second DSP device meets the quality of experience score.

9. The method according to claim 6, wherein the method is performed as part of a tuning process.

10. A communication device provided with a neural network, wherein the neural network is configured to output, during inference, processed audio data based on audio input data, wherein the neural network is obtained by a process according to claim 1.

11. The communication device according to claim 10, wherein the communication device is a two-way communication device comprising a microphone and a speaker.

12. The communication device according to claim 10, wherein the communication device is selected from a group comprising of a hearing aid, a headset, a sound bar, a loudspeaker, a speaker phone, and a conference speaker.

13. A non-transitory computer-readable storage medium storing one or more programs configured to be executed by one or more processors of a processing system, the one or more programs comprising instructions for performing the method according to claim 1.

14. A data processing device for training a neural network that corresponds to a communication device, wherein the neural network is configured to provide, during inference, processed audio data based on audio input data, the data processing device comprising:

circuitry configured to:

execute an audio data obtaining function configured to obtain pairs of target audio data and distorted audio data, execute a user preference obtaining function configured to obtain values of user preference settings, wherein the values are associated to the pairs of target and distorted data sets, and train the neural network by inputting into a loss function the target audio data sets and the processed audio data sets output from the neural network, and the values of the user settings values, and outputting loss data from the loss function into the trained neural network.

15. The data processing device according to claim 14, wherein the values of the user preference settings comprise one or more parameters for controlling denoising, dereverberation, and echo cancellation.

* * * * *